July 22, 1958 A. E. PINET 2,844,651

MODULATION LIMITER FOR MULTIPLEX PULSE COMMUNICATION SYSTEMS

Filed Sept. 16, 1953 2 Sheets-Sheet 1

July 22, 1958 A. E. PINET 2,844,651

MODULATION LIMITER FOR MULTIPLEX PULSE COMMUNICATION SYSTEMS

Filed Sept. 16, 1953 2 Sheets-Sheet 2

United States Patent Office 2,844,651

Patented July 22, 1958

2,844,651

MODULATION LIMITER FOR MULTIPLEX PULSE COMMUNICATION SYSTEMS

André Eugène Pinet, Maisons Alfort, France

Application September 16, 1953, Serial No. 380,421

Claims priority, application France October 16, 1952

4 Claims. (Cl. 179—15)

Figure 1:
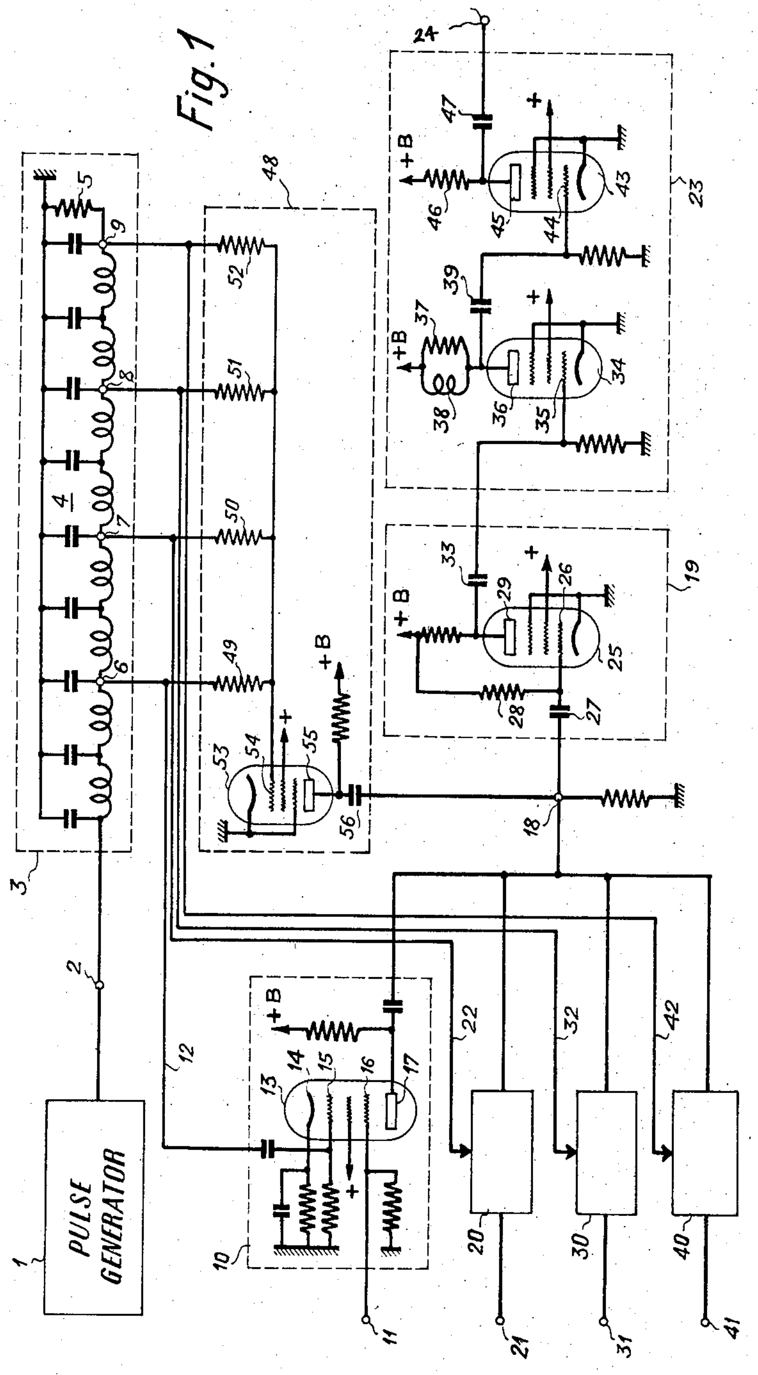

The present invention relates to a modulation limiting device more particularly for use in multiplex systems employing pulse modulation and time division.

In the present specification the expression multiplex equipment for pulse modulation refers to equipment designed for sending and modulating interleaved and recurrent pulses transmitted in sequences and in a certain order with respect to particular pulses called synchronizing pulses, each pulse of a certain order in the sequence being associated with a given communication channel and being modulated according to a given type of modulation in relation with the communication signals, telephone signals for instance, to be transmitted over said channel. The latter signals will be called modulation signals hereinafter.

Regardless of whether the pulses are modulated in amplitude, time or phase, the corresponding modulation characteristic varies, under the control of the modulation signal, between two extreme levels, and it may happen, in cases of overmodulation of a fault in the channel modulating elements, that the channel pulses disappear. In the case, often encountered in practice, where amplitude modulated pulses are generated in the multiplex sending equipment, and where these pulses are converted into phase modulated pulses before being sent over a transmission line, it may happen, with the simple modulation converter circuits ordinarily used for effecting the change of modulation, that to an amplitude modulated pulse of zero amplitude there corresponds the suppression of a phase modulated pulse instead of the production of a phase modulated pulse with a maximum spacing in time from its average position.

This suppression particularly causes an important modification in the frequency spectrum constituted by the sequences of recurrent pulses, by introducing low frequency components into said spectrum. This results in a disturbance in the operation of the general elements of the multiplex sending and receiving equipment, and more especially a defective operation of the elements for the retransmission of signalling signals, in case the latter signals are transmitted, for instance, by the use of components at the average repetition frequency of the pulses.

An object of the present invention is to provide a modulation limiting device applicable to pulse modulating multiplex sending equipment, in which time or phase modulated pulses are generated by a conversion of amplitude modulated pulses, in such a manner that a channel pulse cannot be entirely suppressed in case of overmodulation or stopping of the channel modulating circuits.

Another object of the invention is the use of a pulse modulation multiplex system designed for a given number of channels with a temporarily restricted number of channels, without the pulses corresponding to the temporarily suppressed channels being absent.

In carrying out the invention, the various channel modulators are made operative in sequence by sampling pulses as in known systems, and the amplitude modulated pulses generated by these modulators are added to the sampling pulses before being applied to the modulation converter circuits, so that the amplitudes of the modulated pulses which, without that addition, could be zero in case of overmodulation or stopping of the modulators, retain in such cases, a suitably adjusted non-zero amplitude equal to that of the sampling pulses.

Figure 2:
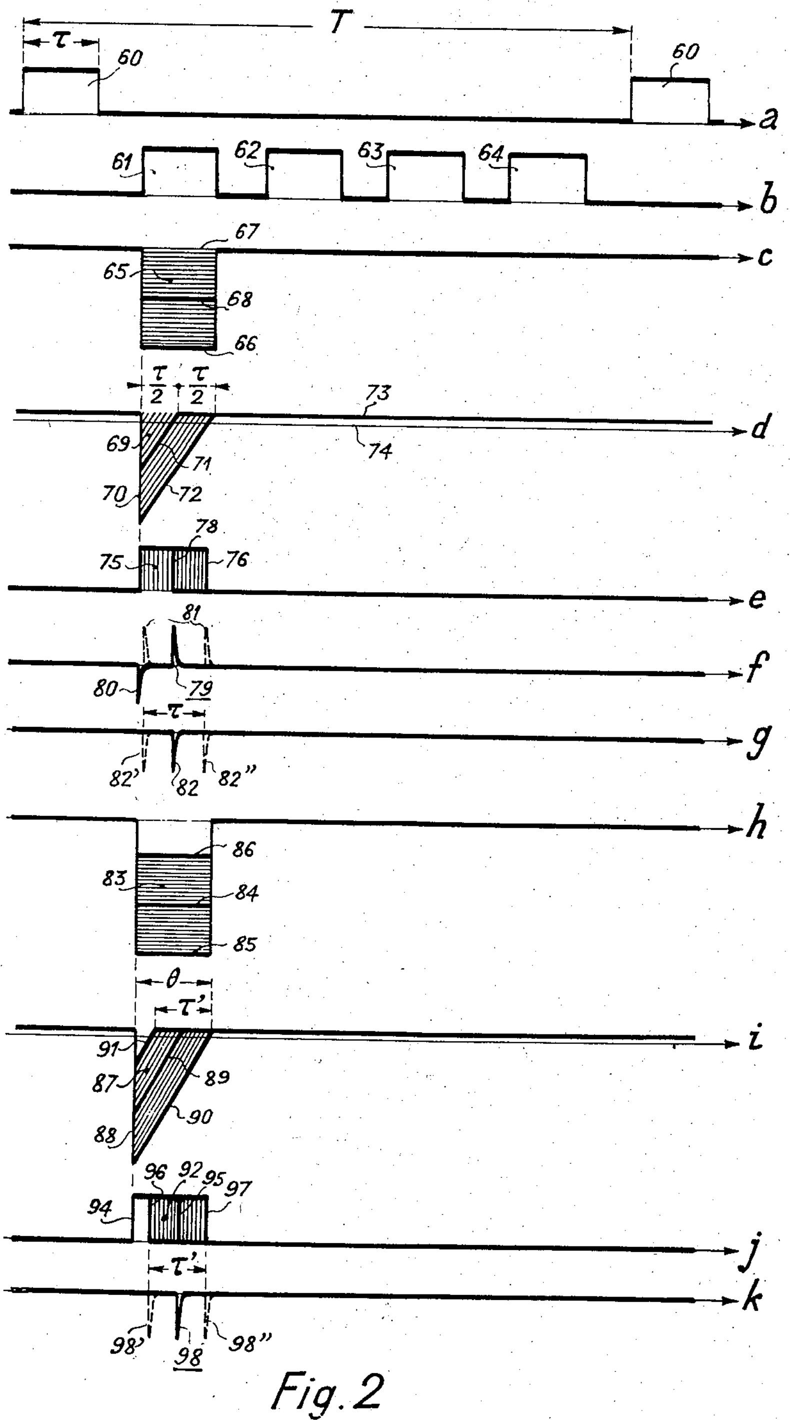

The invention will be better understood from the following detailed description in conjunction with the appended drawings, wherein:

Figure 1 shows, as a diagram, partly of the single wire type, the sending portion of a pulse modulation multiplex equipment incorporating the modulation limiting device of the invention; and Figure 2 is a graphic representation of the wave shape of signals at various points in the circuits of Figure 1, with time shown as abscissae and the amplitudes of said signals as ordinates.

Referring to Figure 1, there is shown a sampling pulse generating circuit 1, at the output 2 of which appear the pulses represented graphically in Figure 2, as a function of time, at 60 on line *a*. They have a positive polarity, a duration $\tau$, and a recurrence period T, the latter period defining the cycle of successive generation of the pulses relative to the various communication channels included in the multiplex equipment.

The terminal 2 is connected to the input of a time distribution circuit 3 shown in the form of a delay line 4. This delay line 4 is closed on an impedance 5 with a value equal to its characteristic impedance and it comprises a series of uniformly spaced taps 6, 7, 8 and 9.

There are also shown a series of amplitude modulation channel modulating circuits, 10, 20, 30 and 40, assumed to be four in number, and each comprising an input terminal, 11, 21, 31 and 41 respectively, to which the modulation signal is applied. They are further connected, respectively, through connections 12, 22, 32 and 42 with the taps 6, 7, 8 and 9 of the delay line 4. Thus the modulator circuits 10, 20, 30 and 40 receive respectively the sampling pulses 61, 62, 63 and 64 represented on line *b* of Figure 2. These pulses have a negative polarity.

The modulator circuit 10 relative to the first channel may consist for example of a pentode tube 13 which receives on its control grid 15 the sampling pulse 61 relative to the first channel, and on its suppressor grid 16 the modulation signal applied to terminal 11. For the whole duration of the sampling pulse 61, the tube 13 is conducting and the value of its anode current is controlled by the modulation signal. In the circuit of the anode 17, negative polarity pulses are collected as represented at 65 on line *c* of Figure 2, the duration of which is equal to that of the sampling signal, and the amplitude of which is between the straight lines 66 and 67 according to the amplitude value of the modulation signal. The straight line 66 which represents the maximum amplitude corresponds to a positive bias voltage for the suppressor grid equal to the bias voltage for the cathode 14, and the straight line 67 which represents the minimum amplitude of the pulse 65 corresponds to a very negative biassing voltage for the suppressor grid.

In addition, the bias of the cathode 14 is so adjusted that in the absence of a signal on the grid 16, the pulse 65 has an amplitude represented by the straight line 68.

It is found that in the case of overmodulation, i. e. when the potential applied to the suppressor grid 16 has a substantially negative value with respect to the potential of the cathode 14, the amplitude of the pulse 65 becomes zero and consequently this pulse disappears.

The modulator circuits of the second, third, and fourth channels are identical with the modulator circuit 10 and the pulses relative to those various channels are similar to the pulse 65 and have an amplitude which depends on the respective modulation signals of these channels.

The outputs of the channel modulator circuits 10, 20, 30 and 40 are connected with a common terminal 18 to which is also connected a first modulation converter circuit 19 followed by a second modulation converter circuit 23. The first converter circuit 19 converts the amplitude modulated pulses into time modulated pulses and the second converter circuit 23 converts the time modulated pulses into phase modulated pulses.

The converter circuit 19 comprises a pentode tube 25 the control grid 26 of which is connected with the terminal 18 through a differentiator circuit comprising the condenser 27 and resistance 28. The cathode 29 of the tube 25 is grounded and the resistance 28 is connected to a point having a positive potential with respect to the cathode.

The converter circuit 19 operates as follows:

The time constant of the differentiator circuit 27—28 is so chosen that the building up of the potential on the grid 26 is effected in a time $\tau/2$ equal to half the duration of the channel pulse 65 when the latter has the average amplitude represented by the straight line 68 which corresponds to the absence of a modulation signal.

As shown by line *d* in Figure 2, there is thus applied to the grid 26 a saw tooth signal 69, the steep side 70 of which coincides with the front side of the pulse 65 and the slanting side of which is displaced parallel with the straight line 71 corresponding to the amplitude 68 of the pulse 65. The straight line 72 corresponds to the amplitude represented by the straight line 66 and obviously no signal is applied to the grid 26 during the modulation peaks which suppress the pulse 65 by limiting it to a non zero amplitude represented by the straight line 67.

The grid bias for the tube 25 is so chosen that the abscissae axis 73 in Figure 2, line *d*, represents the zero potential of the grid 26, while the straight line 74 represents the bias voltage corresponding to the cancellation of the anode current of the tube 25. Consequently, in the circuit of the anode 29, channel pulses of positive polarity are obtained which are time modulated by their rear edges, the one relative to the first channel being represented alone at 75. This pulse has a rear edge 76 when the amplitude of the pulse 65 has the level 66; it has a rear edge 78 when the amplitude of the pulse 65 has the level 68 and finally the pulse 75 has a zero duration when the amplitude of the pulse 65 is zero (Fig. 2, line *e*).

The converter circuit 23 comprises two pentode tubes 34 and 43. The control grid 35 of the tube 34 is connected with the converter circuit 19 through the connecting condenser 33. The circuit of the anode 36 of the tube 34 comprises the resistance 37 and the parallel inductance 38. The anode 36 is connected through the connecting condenser 39 with the control grid 44 of the tube 43. The circuit of the anode 45 of the tube 43 comprises the resistance 46 and this anode is connected through the connecting condenser 47 with the output terminal 24 of the multiplex sending equipment.

The converter circuit 23 operates as follows:

The time modulated pulses such as 75 are differentiated with respect to time by the differentiator circuit 37—38 and the pulses appearing on the anode 36 of the tube 34 are represented at 79 on the line *f* of Figure 2, each pulse like 75 causing the generating of two short pulses 80 and 81, of opposite polarities and coinciding respectively with its front edge and its rear edge.

The tube 43 acts as a clipper and only the positive pulses 81 of line *f* are amplified and reversed in polarity. On the output terminal 24, pulses 82 are obtained (Figure 2, line *g*), which are phase modulated. Each of these pulses 82 has a variable time of appearance, according to the amplitude of the modulation signal, and moves in time between the extreme positions marked by the pulses 82′ and 82″.

It was seen that the modulation peaks could, at times, suppress the channel pulse 65. In such a case, obviously, no pulse 82 is delivered by the tube 43, so that in the system as just described, the phase modulated pulses collected at the terminal 24 may disappear at times instead of only moving in time between two limits. Particularly the pulse 82 disappears in its position 82′ corresponding to a negative modulation peak.

The modulation limiting device 48 is for the purpose of preventing this disappearance.

All taps 6, 7, 8 and 9 of the delay line 4, on which the sampling signals 61 to 64 appear and which are connected to the channel modulator circuits 10, 20, 30 and 40 are also connected with the modulation limiting device 48.

This circuit comprises resistances 49 to 52 connected in parallel at one end to the grid 54 of the clipper tube 53 and at their other ends respectively with the taps 6 to 9. There is thus obtained on the anode 55 of the tube 53 a signal which is none other than the signal of line *b* in Figure 2 but with a reversed polarity and a suitably adjusted amplitude.

This signal is applied to the terminal 18 through the connecting condenser 56 and it is thus added to the signal comprising the pulses 65, represented in line *c* of Figure 2. The result is that the signal applied to the converter circuit 19 is no longer that comprising the pulses 65 shown in line *c*, but that comprising the pulses 83 represented by line *h*. The pulse 83 has an amplitude represented by the straight line 84 in the absence of a modulation signal and an amplitude between the straight lines 85 and 86 and according to the value of the modulation signal, this amplitude being incapable of ever becoming less than that represented by the straight line 86 which corresponds to the amplitude of the pulse from the modulation limiting device 48.

The new saw tooth signal applied to the grid 26 of the tube 25 is represented at 87 on line *i* of Figure 2. The steep edge 88 of this saw tooth coincides in time with the front edge of the pulse 83. The inclined edge of the saw tooth is an inclined straight line which occupies the position 89 in the absence of a modulation signal and one of the positions 90 or 91 during the modulation peaks.

The new time modulated signal is represented by the pulses 92 of the line *j* of Figure 2. Its front edge 94 coincides in time with the front edge of the pulse 83: its rear edge occupies the position 95 in the absence of the modulation signal and one of the positions 96 or 97 during the modulation peaks.

The new phase modulated signal is represented by the pulses 98 of the link *k* in Figure 2. These pulses move in time between the extreme positions marked by the pulses 98′ and 98″ but contrary to what occurred in the case of the pulse 82 of line *g*, the pulse 98 does not disappear in its position 98′ while the pulse 82 disappeared in its position 82′.

It should be noted that the time interval $\tau$ for the total displacement of the pulse 98 is less than the duration $\tau$ of a sampling pulse. If it is desired that the total displacement $\tau'$ of the pulse 98 (Figure 2, line *g*) be the same as the total displacement of the pulse 82 (Fig. 2, line *g*), there should be taken, as a new duration $\theta$ for the sampling pulses, a duration exceeding $\tau$ by an amount equal to the interval between the fronts 94 and 96 of the duration modulated pulse 92 having the minimum duration.

Thus, owing to the modulation limiting device according to the invention, each time a channel modulator circuit delivers no signal, either because of overmodulation or due to accidental or wilful stopping, the corresponding pulse 98 will always exist and will occupy the position 98′.

Although the invention has been described with reference to a specific example of embodiment, it should be understood that modifications are possible within the knowledge of one skilled in the art and that said modifications are within the scope of the present invention.

I claim:

1. In a transmitting device for a multiplex time division electric pulse transmission system including a plurality of channels successively rendered operative under the action of channel selection pulse voltages staggered in time and derived from a main pulse generator, a plurality of pulse amplitude modulators each fed from one of said channel selection pulse voltages and from modulation signals pertaining to one respective communication channel, means for adding in a common circuit to each one of said amplitude-modulated pulses a constant amplitude auxiliary pulse voltage synchronous with said one of said amplitude-modulated pulses, a utilization circuit, and means for applying the whole of the added voltages of said amplitude modulated and auxiliary pulses to said utilization circuit, whereby non-zero signals representing each of said channels are obtained in said utilization circuit in the event that any of said amplitude-modulated pulses have momentarily a zero amplitude.

2. A device as claimed in claim 1, comprising a delay line fed from said main pulse generator and including tappings connected through resistors to the control grid of a common electron tube having at least a cathode, a control grid and an anode, said anode being connected to said common circuit, the amplitude of said channel selection voltages being large enough to cause the anode current of said tube to be alternately cut off and given a maximum value limited by the appearance of grid current in said tube, whereby said auxiliary pulse voltages of constant amplitude are obtained in the anode circuit of said tube and impressed upon said common circuit.

3. A device as claimed in claim 1, wherein said utilization circuit includes a modulation converter transforming amplitude-modulated pulses into duration-modulated pulses.

4. A device as claimed in claim 1, wherein said utilization circuit includes a modulation converter transforming amplitude-modulated pulses into time-position-modulated pulses.

References Cited in the file of this patent

UNITED STATES PATENTS

| | | |
|---|---|---|
| 2,408,077 | Labin | Sept. 24, 1946 |
| 2,567,203 | Golay | Sept. 11, 1951 |
| 2,609,529 | Lesti | Sept. 2, 1952 |
| 2,660,618 | Aigrain | Nov. 24, 1953 |